Figure 1:
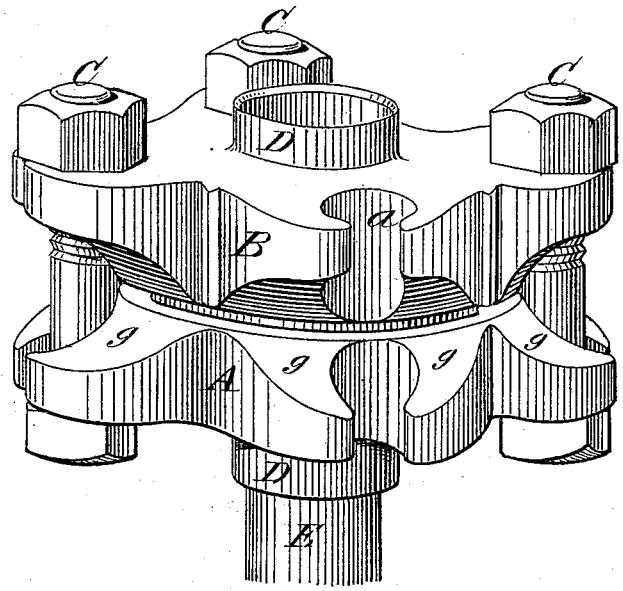

(No Model.) 2 Sheets—Sheet 1.

W. M. MIXER.
FLANGE UNION FOR REFRIGERATING OR ICE MAKING MACHINERY.
No. 253,482. Patented Feb. 7, 1882.

Witnesses: Inventor:

(No Model.) 2 Sheets—Sheet 2.

W. M. MIXER.
FLANGE UNION FOR REFRIGERATING OR ICE MAKING MACHINERY.

No. 253,482. Patented Feb. 7, 1882.

UNITED STATES PATENT OFFICE.

WILLIAM M. MIXER, OF NEW YORK, N. Y., ASSIGNOR TO THE DE LA VERGNE & MIXER REFRIGERATING COMPANY, OF SAME PLACE.

FLANGE-UNION FOR REFRIGERATING OR ICE-MAKING MACHINERY.

SPECIFICATION forming part of Letters Patent No. 253,482, dated February 7, 1882.

Application filed January 10, 1882. (No model.)

*To all whom it may concern:*

Be it known that I, WILLIAM M. MIXER, a citizen of the United States, residing in the city, county, and State of New York, have invented a certain new and useful Improvement in Flange-Unions for Refrigerating or Ice-Making Machinery, which is fully set forth in the accompanying specification and drawings.

The object of this invention is to provide a flange-union adapted for connecting steam or gas pipe under heavy pressure without risk of leakage, and constructed in such a manner as to prevent the gasket or packing from being either blown outward by pressure of steam or gas or driven inwardly by the compression of bolts or other means—in fact, to hold it permanently in place without a chance for escape, thereby insuring a joint that shall remain at all times perfectly tight; in addition thereto, to provide a flange-union so constructed that in case leaks should occur through pin or blow holes in the bolt-holes of the flange they may be accessible and be stopped by plugging or soldering; at the same time maintain a strength of metal to hold the male and female parts of the flange sufficiently tight to prevent leakage. Another object is to combine the two blocks of the union in a manner that will enable the mechanic to readily see the engaging parts and thereby save time in applying them; also, to combine with a flange-union possessing the described advantages a means of strengthening and securing the pipe-joint of the flange against the possibility of a leak; and to this end the invention consists, first, in the combination of a male and a female block of a flange-union, each having a threaded pipe-aperture, corresponding bolt-holes with bolts, and a gasket interposed between the male and female blocks, when the female block is provided with a depressed gasket-seat between the bolt-holes, and the center of the flange is surrounded upon the inner as well as the outer side of said seat with an annular ring or raised washer, as will hereinafter appear; second, of the combination of a male and female block of a flange-union, as above described, each block having a flange or sections of a flange cut away or dished from its inner side in a manner to admit of an ocular demonstration of the proper arrangement of interlocking parts, as will hereinafter appear; third, of the combination of a male and female block of a flange-union, as described in the first section of the statement of invention, and each block of the union having that portion of its flange through which the bolts pass dished or cut away in a manner to admit of boring, plugging, or soldering the inner side of the bolt-holes, as will hereinafter appear; fourth, of the combination of a male and female block of a flange-union and an interposed gasket, each block having corresponding bolt-holes and bolts, the female block having a depressed gasket-seat, which seat is surrounded upon its inner and outer sides by a raised washer or annular ring, a threaded pipe-aperture which is surrounded at either end by an annular recess, or a collar forming a recess, when the pipe is inserted in such pipe-aperture, and bolt-holes outside of the raised washers, the male block also having inside of the bolt-holes a raised washer or annular ring corresponding to the depressed gasket-seat of the female block, and a threaded pipe-aperture which is surrounded at either end by a recess, or a collar forming a recess, when the pipe is inserted in such pipe-aperture, as will hereinafter appear.

Reference being made to the drawings, similar letters represent similar parts.

Figure 2:
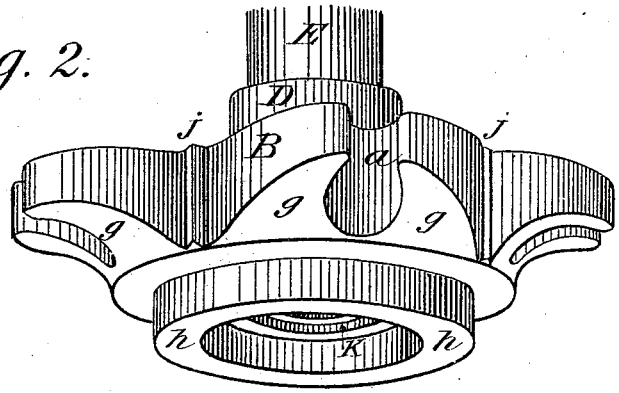
Figure 3:
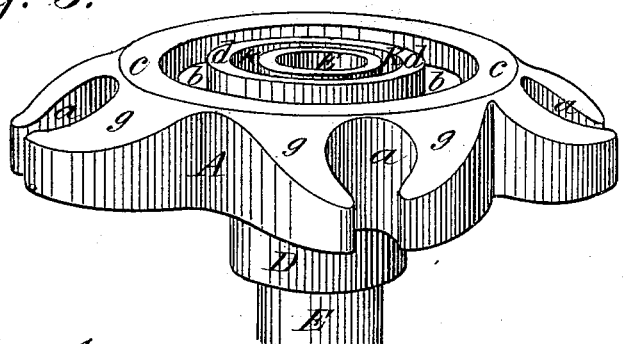
Figure 4:
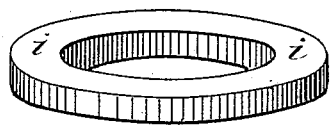

Figure 1 is a view in perspective of the flange-union. Fig. 2 is a perspective view of the male block of the union. Fig. 3 is a perspective view of the female block of the union. Fig. 4 represents the gasket which is interposed between the male and female blocks when combined.

A is the female block of the flange-union. B is the male block. C are the bolts passing through corresponding bolt-holes, *a a*, in each block to draw the parts together. D is a collar cast upon the exterior of each block, and which surrounds the exterior opening of the threaded pipe-aperture F, Figs. 2 and 3. It is of sufficient size to form a recess between it and the pipe when the pipe is introduced into the pipe-aperture of the blocks, and is so made for the purpose of introducing therein an amalgamating or soldering metal to weld or solder the pipes and block of the union together. At K, Fig. 3, is seen another recess, surrounding the other end of the pipe-aperture for the same purpose, and is formed by cutting out the inner side of the washer or a part of the gasket-seat.

E E, Figs. 1, 2, and 3, are pipes which pass through the collars D, and are fastened into the threaded aperture of blocks A and B of the union by corresponding screw-threads, b.

Fig. 3 is the depressed gasket-seat of the female block of the union, around which, and inside of the bolt-holes, is an annular ring or raised washer, C, to prevent the gasket from being driven outwardly by gas-pressure, compression of the bolts, or otherwise. d is another annular ring or raised washer upon the inner side of the gasket-seat b, to aid in holding the gasket securely in place and prevent it from being forced by the compression of the bolts or the variation of temperature into the passage-way for the gas through the flange.

g g, Figs. 1, 2, and 3, represent the dished or cut-away sections of the flange of each block of the union when the blocks of a flange-union are fastened on pipe and the gasket is inserted in its seat. If the union is made with flanges of the usual form, the parts are difficult to adjust properly, thereby causing numerous and vexatious delays. By cutting away or dishing the flange we are enabled to see the interlocking parts and place them in exact position. It also affords access to the inner side of the bolt-holes for boring, plugging, and soldering them in case of a leak being found therein in consequence of imperfections in the castings, and should a leak occur in any other part of the union it would be more readily observed and remedied. The outside of the bolt-holes a are cut or slotted to introduce the bolts without stopping to remove the nuts.

h is an annular ring or raised washer upon the male block B, which corresponds in location to the depressed gasket-seat b, and into which it is inserted upon a gasket, i, made of soft metal or other suitable material. j is a small rib cast upon the male to designate it from the female block.

In the manufacture and use of refrigerating or ice-making machinery, where gases are employed that require heavy pressure to compress them for liquefaction, it becomes imperative that all joints shall be perfectly tight, as the leakage not only involves a heavy loss, but impairs the operation of the machines. Such flanges as were formerly made could not be relied upon and were unsatisfactory in forming steam-tight joints. They have been made with a raised washer or annular ring on the outside of a depressed gasket-seat, as in patent issued to Aug. A. Dame, June 17, 1873, No. 139,877. For refrigerating purposes it has been found that such flanges, when first connected, were to all appearances perfectly tight; but upon the working of the machines the gasket gradually yields to the pressure exerted upon it, caused by the heat arising from the compression of the gas, and is forced into the gas-passage way, obstructing its flow. Upon the cooling of the pipes the gas, still being under pressure, will leak, and it becomes necessary to screw up the bolts again. This has to be repeated again and again until the packing has been forced from between the blocks. My invention remedies such defect by holding the gasket in place and preventing its being dislodged by any pressure.

It is evident that a pipe can be inserted through the female block to the level of the raised washer c and used as a substitute for the washer d, and a recess cut out of the depressed gasket-seat for soldering, as at K; but I prefer the method set forth.

Having described my invention, what I claim as new, and desire to secure by Letters Patent of the United States, is—

1. An improved flange-union, consisting of the male and female blocks A and B, each having a threaded pipe-aperture and interlocking surfaces, corresponding bolt-holes, a, exterior to the washer c, an interposed gasket, i, and bolts C, the female block having a depressed gasket-seat with an annular ring or raised washer, d, upon its inner side, and another annular ring or raised washer, c, upon its outer side, and the male block having a raised washer, h, corresponding in location to the depressed gasket-seat b, substantially as described.

2. An improved flange-union, consisting of a male and female block and an interposed gasket and bolts, each block having a dished or cut-away flange or sections of a flange, g g, a threaded pipe-aperture, and corresponding bolt-holes exterior to their interlocking parts, the female being provided with a raised washer or annular ring both upon the inside and outside of a depressed gasket-seat, and the male block with a raised washer or annular ring corresponding in location to the gasket-seat of the female block, substantially as described.

3. An improved flange-union, consisting of a male and female block, an interposed gasket and bolts, each block having corresponding bolt-holes, a threaded pipe-aperture, and an annular recess or recessed collar surrounding either extremity of such aperture, the female block being provided with a depressed gasket-seat having a raised washer both upon the inner and outer side of said seat, and bolt-holes exterior thereto, the male with a washer or annular ring corresponding in location to the gasket-seat of the female block, substantially as described.

4. An improved flange-union, consisting of the female block A, with the raised washers c and d, a depressed gasket-seat, b, bolt-holes a exterior to the washer or ring c, a threaded pipe-aperture, a recess or recessed collar, K or D, surrounding either end of the pipe-aperture, and dished or cut-away flanges or sections of flanges g g, the male block having a raised washer or ring, $h$, corresponding in location to the gasket-seat of the female block, bolt-holes $a$, corresponding to those of the female block, a recess or recessed collar, K or D, surrounding either end of the pipe-aperture, and dished or cut-away flanges or sections of flanges $g\ g$, in combination with a gasket, $i$, and bolts C, substantially as described.

In testimony whereof I have hereunto set my hand in the presence of two witnesses.

WILLIAM M. MIXER.

Witnesses:
O. W. REED,
J. H. MACY.